(12) United States Patent
Pope et al.

(10) Patent No.: US 11,245,580 B2
(45) Date of Patent: Feb. 8, 2022

(54) NETWORK INTERFACE DEVICE

(71) Applicant: Xilinx, Inc., San Jose, CA (US)

(72) Inventors: Steven Leslie Pope, Cambridge (GB);
David James Riddoch, Fenstanton (GB)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/146,128

(22) Filed: Sep. 28, 2018

(65) Prior Publication Data
US 2020/0106668 A1 Apr. 2, 2020

(51) Int. Cl.
*H04L 12/24* (2006.01)
*H04W 88/18* (2009.01)
*H04L 12/801* (2013.01)
*H04W 80/02* (2009.01)

(52) U.S. Cl.
CPC .......... *H04L 41/0813* (2013.01); *H04L 47/10* (2013.01); *H04W 88/184* (2013.01); *H04W 80/02* (2013.01)

(58) Field of Classification Search
CPC ... G06F 9/546; H04L 12/935; H04L 41/0813; H04L 47/10; H04W 80/02; H04W 88/184
See application file for complete search history.

(56) References Cited

U.S. PATENT DOCUMENTS

| 6,598,063 | B1 | 7/2003 | Tang et al. |
| 7,376,125 | B1 | 5/2008 | Hussain et al. |
| 7,382,787 | B1 * | 6/2008 | Barnes ..................... H04L 69/22 370/401 |
| 7,861,067 | B1 | 12/2010 | Chayut |
| 7,917,876 | B1 | 3/2011 | Schumacher et al. |
| 8,181,024 | B2 | 5/2012 | Nagai et al. |
| 9,450,945 | B1 | 9/2016 | Koeten et al. |
| 9,832,121 | B1 * | 11/2017 | Singh ..................... H04L 47/122 |
| 9,860,258 | B1 | 1/2018 | Collins et al. |
| 9,886,072 | B1 | 2/2018 | Venkataraman |
| 9,940,284 | B1 | 4/2018 | Davis et al. |
| 10,496,593 | B1 | 12/2019 | Miller et al. |
| 10,516,626 | B1 | 12/2019 | Kodeboyina et al. |
| 10,755,024 | B1 | 8/2020 | Chow et al. |
| 2001/0003834 | A1 | 6/2001 | Shimonishi |
| 2003/0023838 | A1 | 1/2003 | Karim et al. |
| 2004/0189650 | A1 * | 9/2004 | Deering ................ G06T 15/005 345/506 |

(Continued)

FOREIGN PATENT DOCUMENTS

EP 2722767 A1 4/2014

OTHER PUBLICATIONS

Extended European Search Report for European Application No. EP 19200398.6 dated Jan. 16, 2020.

(Continued)

*Primary Examiner* — Melanie Jagannathan
(74) *Attorney, Agent, or Firm* — Wolf, Greenfield & Sacks, P.C.

(57) ABSTRACT

A network interface device comprises a plurality of components configured to process a flow of data one after another. A control component is configured to provide one or more control messages in said flow, said one or more control message being provided to said plurality of components one after another such that a configuration of one or more of said components is changed.

39 Claims, 10 Drawing Sheets

(56) References Cited

U.S. PATENT DOCUMENTS

| | | | |
|---|---|---|---|
| 2005/0159181 A1 | 7/2005 | Gadgil et al. | |
| 2006/0117126 A1* | 6/2006 | Leung, Jr. | H04L 45/00 |
| | | | 710/306 |
| 2007/0171839 A1 | 7/2007 | Sankala et al. | |
| 2007/0214302 A1 | 9/2007 | Kubo et al. | |
| 2010/0183011 A1* | 7/2010 | Chao | G06Q 10/04 |
| | | | 370/392 |
| 2010/0229137 A1 | 9/2010 | Liu et al. | |
| 2011/0149966 A1* | 6/2011 | Pope | H04L 69/22 |
| | | | 370/392 |
| 2013/0044641 A1 | 2/2013 | Koponen et al. | |
| 2013/0179485 A1* | 7/2013 | Chapman | H04L 67/02 |
| | | | 709/201 |
| 2014/0310405 A1 | 10/2014 | Pope et al. | |
| 2014/0351526 A1 | 11/2014 | Peterson | |
| 2014/0351777 A1 | 11/2014 | Chang et al. | |
| 2015/0124827 A1* | 5/2015 | Rangaraman | H04L 12/4666 |
| | | | 370/392 |
| 2015/0131456 A1 | 5/2015 | Allmendinger et al. | |
| 2015/0199461 A1 | 7/2015 | Laisne | |
| 2015/0205324 A1 | 7/2015 | Havlir et al. | |
| 2016/0127275 A1 | 5/2016 | Asa | |
| 2016/0134588 A1 | 5/2016 | Falkowitz et al. | |
| 2016/0323216 A1 | 11/2016 | LeVasseur et al. | |
| 2017/0180273 A1* | 6/2017 | Daly | H04L 69/22 |
| 2017/0323417 A1 | 11/2017 | Madajczak | |
| 2017/0337149 A1 | 11/2017 | Onuki et al. | |
| 2018/0219800 A1 | 8/2018 | Huynh et al. | |
| 2018/0329644 A1* | 11/2018 | Das | G06F 3/0604 |
| 2018/0365358 A1 | 12/2018 | Falkowitz et al. | |
| 2019/0005239 A1 | 1/2019 | Falkowitz et al. | |
| 2019/0347106 A1* | 11/2019 | Kadowaki | G06F 9/546 |
| 2020/0076684 A1 | 3/2020 | Naveen et al. | |
| 2020/0104269 A1 | 4/2020 | Pope et al. | |
| 2020/0145376 A1 | 5/2020 | Pope et al. | |
| 2020/0344180 A1 | 10/2020 | Pope et al. | |

OTHER PUBLICATIONS

International Search Report and Written Opinion for International Application No. PCT/EP2019/080281 dated Jan. 30, 2020.
[No Author Listed], CBG-BSV Third-Party Bluespec Compiler. 14 pages. https://www.cl.cam.ac.uk/~djg11/wwwhpr/toy-bluespec-compiler.html [last accessed Apr. 25, 2019].
[No Author Listed], Empowering OVS with eBPF. 4 pages. https://ovsfall2018.sched.com/event/IO7j/empowering-ovs-with-ebpf [last accessed Apr. 25, 2019].
Bershad et al., Extensibility, Safety and Performance in the SPIN Operating System. Department of Computer Science and Engineering. University of Washington. 1995. 17 pages.
Gordon, Programmable hardware for high performance SDN. Optical Fiber Communication Conference, Optical Society of America. Mar. 22, 2015:3 pages.
Li et al., Clicknp: Highly flexible and high performance network processing with reconfigurable hardware. Proceedings of the 2016 ACM SIGCOMM Conference. Aug. 22, 2016:1-14.
Mccane et al., The BSD Packet Filter: A New Architecture for User-level Packet Capture. Preprint paper for 1993 Winter USENIX Conference. Dec. 19, 1992. 11 pages.
Mogul et al., The Packet Filter: An Efficient Mechanism for User-level Network Code. Department of Computer Science. Carnegie-Mellon University. Nov. 1987. 34 pages.
Tu et al., Bringing the Power of eBPF to Open vSwitch. Kernel. 2018. 11 pages.

* cited by examiner

NETWORK INTERFACE DEVICE

FIELD

This application relates to network interface devices and in particular but not exclusively to the configuration of network interface devices.

BACKGROUND

Network interface devices are known and are typically used to provide an interface between a computing device and a network. The network interface device can be configured to process data which is received from the network and/or process data which is to be put on the network.

Increasingly, network interface devices are being provided with more capabilities in terms of processing capacity which may be configured as required by the applications which the network interface device supports.

SUMMARY

According to an aspect, there is provided a network interface device comprising: a plurality of components configured to process a flow of data one after another; a control component configured to provide one or more control messages in said flow, said one or more control message being provided to said plurality of components one after another such that a configuration of one or more of said components is changed.

Each of said plurality of components may be configured to update its configuration in response to said one or more control messages such that data received after the control message in said flow is processed by the respective component with its updated configuration.

The control component may be configured to receive a request and in response thereto to configure one or more components.

The control component may be configured to allocate one or more of said components to process a respective flow of data in response to said request.

The request may be received from an application.

The request may be configured to cause said one or more components to process a respective flow of data to provide at least a partial offload of data processing required for said application.

The network interface device may comprise at least one interface configured to interface with a host device.

The network interface device may comprise at least one interface configured to interface with a network.

The at least one control message provided by the controller may be configured to cause said plurality of components to define a data pipeline for a respective flow of data.

The at least one control message provided by the controller may be configured to cause one of the creation and configuration of interconnect resources between at least two of said plurality of components to define a data path between at least two of said components of said data pipeline.

The control component may be configured to inject said one or more control packets into said data flow.

The control component may be configured to cause one or more request control messages to be output which are configured to cause one or more components to provide status information in response thereto.

The status information may comprise one or more of status information, performance information and availability information.

The control component may be configured to cause one or more policies to be changed and to apply said one or more changed policy.

The at least one component may be associated with a first level of privilege and said controller is configured to configure said at least one component only if an associated application is entitled make use of a component with that first level of privilege.

The components configured to process said flow of data may define a data path,

The components defining a data path may comprise at least one of: an interface with a host device; a processing engine; and an interface with a network.

The data path may comprise a data processing pipeline.

At least one component may comprises at least one accelerator.

The accelerator may comprise a hardware implemented accelerator.

The at least one accelerator may comprise one or more of a video processing accelerator, a security accelerator, and a protocol processing entity.

The control message may be configured to cause one or more of creation of bus resources, allocation of one or more components to a data path and allocation of one or more interfaces.

The plurality of components may comprise one or more an FPGA, a CPU, a GPU and an IPU.

At least one of said plurality of components may comprise an FPGA and said control message may be configured to reprogram at least a part of said FPGA.

The device may be provided by a plurality of dies, wherein said plurality of components comprise at least one component provided by one die and at least one component provided by another die, said dies being interconnected on a substrate to form at least a part of said device.

The management controller may be provided on one or more of the dies.

One or more control packets may comprise information indicating that said control packet is a control packet.

One or more control packet may comprise information identifying at least one of said plurality of components and a request for the respective component.

Each component identified in said request may be configured, on receiving said control message to respond to said request and to update status information associated with that component in said control message.

Each component identified in said request may be configured, on receiving said control message to respond to said request and when said request is a read request to provide requested data in said control message.

The network interface device may comprise an interface which is configured to receive a program which is compiled and which causes the provision of one or more of: configuration commands for one or more components; and one or more programs to be executed in one or more components.

The configuration commands may be provided by said controller in one or more messages.

The configuration commands may be generated by said controller in response to execution of said compiled program in said controller.

According to another aspect, there is provided a network interface device comprising: a plurality of components; a control component configured to provide a control, said control message being provided to said plurality of components one after another such that said plurality of components of are configured to process a flow of data.

According to another aspect, there is provided a method comprising: providing by a control component one or more control messages in a flow of data to a plurality of components, said one or more control message being provided to said plurality of components one after another; and responsive to receiving said one or more control messages, configuring each of said plurality of components based on said one or more control messages.

The configuring may be such that the configuration of each of said plurality of components in response to said one or more control messages is such that data received after the control message in said flow is processed by the respective component with its updated configuration.

The method may comprise receiving by the control component a request and in response thereto to configuring one or more components.

The method may comprise allocating by the control component one or more of said components to process a respective flow of data in response to said request.

The request may be received from an application.

The method may comprising receiving the request at one or more components and in response, the method may comprise processing by said one or more components a respective flow of data to provide at least a partial offload of data processing required for said application.

The network interface device may comprise at least one interface configured to interface with a host device.

The network interface device may comprise at least one interface configured to interface with a network.

The method may comprise, in response to the at least one control message provided by the controller, causing said plurality of components to define a data pipeline for a respective flow of data.

The method may comprise in response to at least one control message provided by the controller, causing one of the creation and configuration of interconnect resources between at least two of said plurality of components to define a data path between at least two of said components of said data pipeline.

The method may comprise injecting by the control component one or more control packets into said data flow.

The method may comprise outputting by the control component one or more request control messages to be output which are configured to cause one or more components to provide status information in response thereto.

The status information may comprise one or more of status information, performance information and availability information.

The method may comprise causing by the control component one or more policies to be changed and to apply said one or more changed policy.

The at least one component may be associated with a first level of privilege and the method comprises configuring by said controller said at least one component only if an associated application is entitled make use of a component with that first level of privilege.

The method may comprise providing a data paths by the components configured to process said flow of data.

The components defining a data path may comprise at least one of: an interface with a host device; a processing engine; and an interface with a network.

The data path may comprise a data processing pipeline.

At least one component may comprises at least one accelerator.

The accelerator may comprise a hardware implemented accelerator.

The at least one accelerator may comprise one or more of a video processing accelerator, a security accelerator, and a protocol processing entity.

The method may comprise causing one or more of creation of bus resources, allocation of one or more components to a data path and allocation of one or more interfaces.

The plurality of components may comprise one or more an FPGA, a CPU, a GPU and an IPU.

At least one of said plurality of components may comprise an FPGA and said control message may be configured to reprogram at least a part of said FPGA.

The device may be provided by a plurality of dies, wherein said plurality of components comprise at least one component provided by one die and at least one component provided by another die, said dies being interconnected on a substrate to form at least a part of said device.

The management controller may be provided on one or more of the dies.

One or more control packets may comprise information indicating that said control packet is a control packet.

One or more control packet may comprise information identifying at least one of said plurality of components and a request for the respective component.

The method may comprise receiving said control message at each component identified in said request, in response to receiving said control message responding to said request and updating status information associated with that component in said control message.

The method comprises receiving said control message at each component identified in said request, responding to said request and when said request is a read request providing requested data in said control message.

The network interface device may comprise an interface and the method comprise receiving at the interface a program which is compiled and which causes the provision of one or more of: configuration commands for one or more components; and executing one or more programs in one or more components.

The method may comprise providing configuration commands by said controller in one or more messages.

The method may comprise generating the configuration commands by said controller in response to executing said compiled program in said controller.

A computer program comprising program code means adapted to perform the herein described methods may also be provided. In accordance with further embodiments apparatus and/or computer program product that can be embodied on a computer readable medium for providing at least one of the above methods is provided.

In the above, many different embodiments have been described. It should be appreciated that further embodiments may be provided by the combination of any two or more of the embodiments described above.

Various other aspects and further embodiments are also described in the following detailed description of examples embodying the invention and in the attached claims.

BRIEF DESCRIPTION OF FIGURES

Some embodiments will now be described by way of example only with reference to the accompanying Figures in which.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

When data is to be transferred between two data processing systems over a data channel, such as a network, each of the data processing systems has a suitable network interface to allow it to communicate across the channel. Often the network is based on Ethernet technology. It should be appreciated that other networks may use other technology.

Data processing systems that are to communicate over a network are equipped with network interfaces that are capable of supporting the physical and logical requirements of the network protocol. The physical hardware component of network interfaces are sometimes referred to as network interface devices or network interface cards (NICs) or network adapters.

Computer systems generally include an operating system (OS) through which user level applications communicate with the network. A portion of the operating system, known as the kernel may comprise protocol stacks for translating commands and data between the applications and a device driver specific to the network interface devices. By providing these functions in the operating system kernel, the complexities of and differences among network interface devices may be hidden from the user level application. The network hardware and other system resources (such as memory) can be safely shared by many applications and the system can be secured against faulty or malicious applications.

Figure 1:
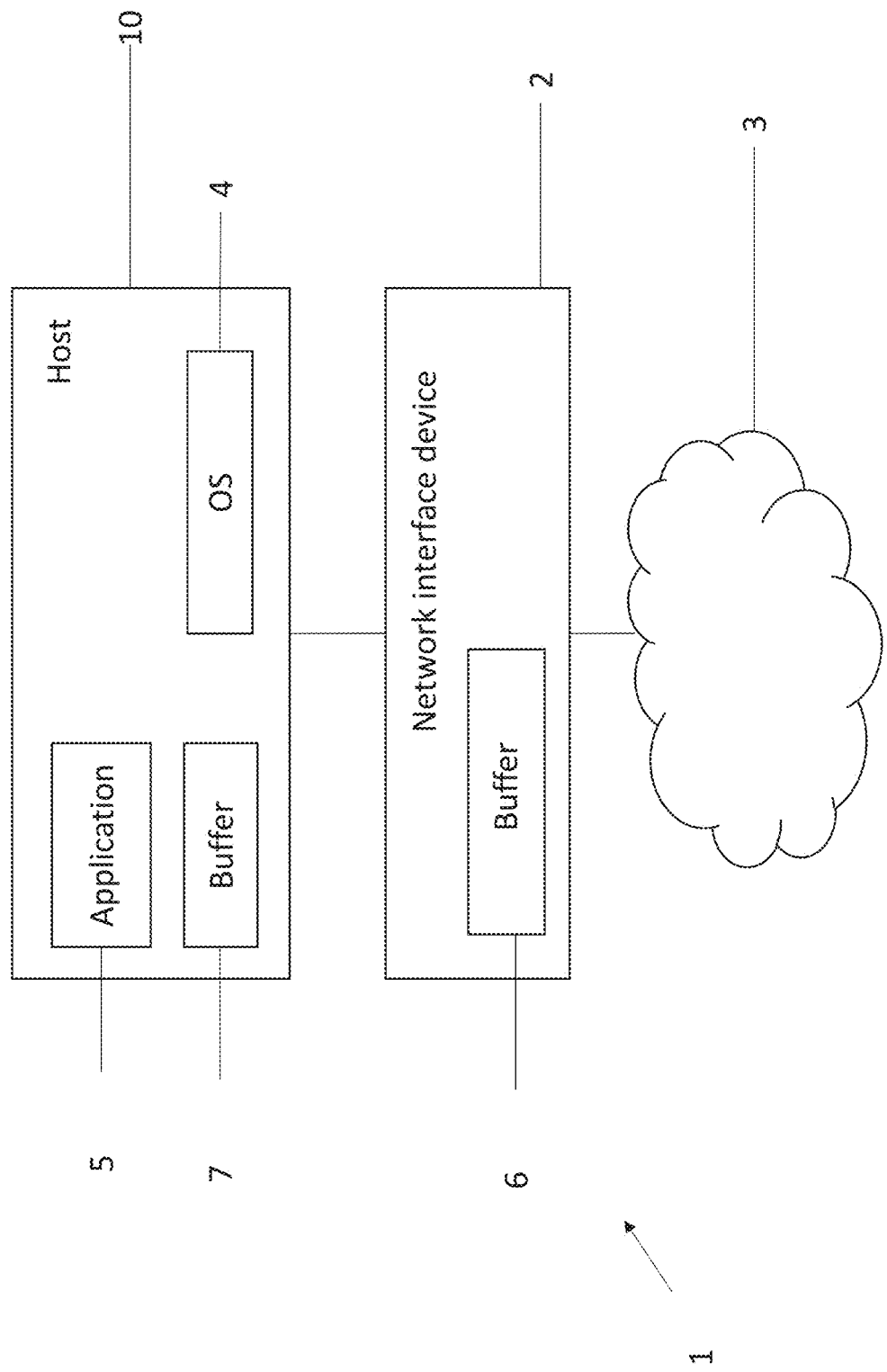
FIG. 1 shows a schematic view of a network interface device and host device.

An example data processing system 1 for carrying out communications across a network is shown in FIG. 1. The data processing system 1 comprises a host computing device 10 coupled to a network interface device 2 that is arranged to interface the host to network 3. The host computing device 10 has an operating system 4 supporting one or more user level applications 5.

The host computing device 10 may also include a network protocol stack (not shown). For example, the protocol stack may be a component of the application, a library with which the application is linked, or be provided by the operating system. In some embodiments, more than one protocol stack may be provided. The network protocol stack may be a Transmission Control Protocol (TCP) stack or any other suitable stack depending on the transport protocol which is being supported.

The application 5 can send and receive TCP/IP messages by opening a socket and reading and writing data to and from the socket, and the operating system 4 causes the messages to be transported across the network. For example, the application can invoke a system call (syscall) for transmission of data through the socket and then via the operating system 4 to the network 3. This interface for transmitting messages may be known as the message passing interface.

Instead of implementing the stack in the host 10, some systems offload at least a part of the protocol stack to the network interface device 102. In some embodiments, at least a part of the protocol stack may be provided at the user level.

For example, in the case that the stack is a TCP stack, the network interface device 2 may comprise a TCP Offload Engine (TOE) for performing the TCP protocol processing. By performing the protocol processing in the network interface device 2 instead of in the host computing device 10, the demand on the host system's 10 processor/s may be reduced. Data to be transmitted over the network, may be sent by an application 5 via a TOE-enabled virtual interface driver, by-passing the kernel TCP/IP stack entirely. Data sent along this fast path therefore need only be formatted to meet the requirements of the TOE driver.

The host computing device 10 may comprise one or more processors and one or more memories. In some embodiments, the host computing device 10 and the network interface device 2 may communicate via a bus, for example a peripheral component interconnect express (PCIe bus).

During operation of the data processing system, data to be transmitted onto the network may be transferred from the host computing device 10 to the network interface device 2 for transmission. In one example, data packets may be transferred from the host to the network interface device directly by the host processor. The host may provide data to one or more buffers 6 located on the network interface device 2. The network interface device 2 may then prepare the data packets and transmit them over the network 3.

Alternatively, the data may be written to a buffer 7 in the host system 10. The data may then be retrieved from the buffer 7 by the network interface device and transmitted over the network 3.

In both of these cases, data is temporarily stored in one or more buffers prior to transmission over the network.

During operation of the data processing system, data may be received from the network. The data may be directed to the host computing device 10.

Some network interface devices are becoming more complex and capable of providing a wide range of functions.

Some embodiments may support the transmission of data over a network from a data processing system and/or the receipt of data from the network. A data processing system could be any kind of computing device, such as a server, personal computer or handheld device. Some embodiments may be suitable for use in networks that operate TCP/IP over Ethernet. In other embodiments one or more different protocols may be used. Embodiments may be used with any suitable networks, wired or wireless.

In some embodiments, the NIC functionality may be at least partially provided by a field programmable gate array FPGA and/or one or more processing units such as a CPU, IPU or GPU. One or more of these may support one or more applications. One or more of these may be configured after the network interface device has been deployed and/or before the network interface device has been deployed.

For example an FPGA may be implemented using an integrated circuit designed to be configured by a customer or designer after its manufacture. FPGAs may offer the ability to deploy a circuit which provides an application specific solution. An FPGA can allow for customization of a network interface device. Such applications may be niche or small volume applications. The FPGA is an array of programmable logic blocks. An FPGA may be characterised as being reprogrammable at the logic element granularity. An FPGA may be regarded as being an array of gates.

The data may be a data packet having a payload and header according to a suitable network protocol.

Figure 2:
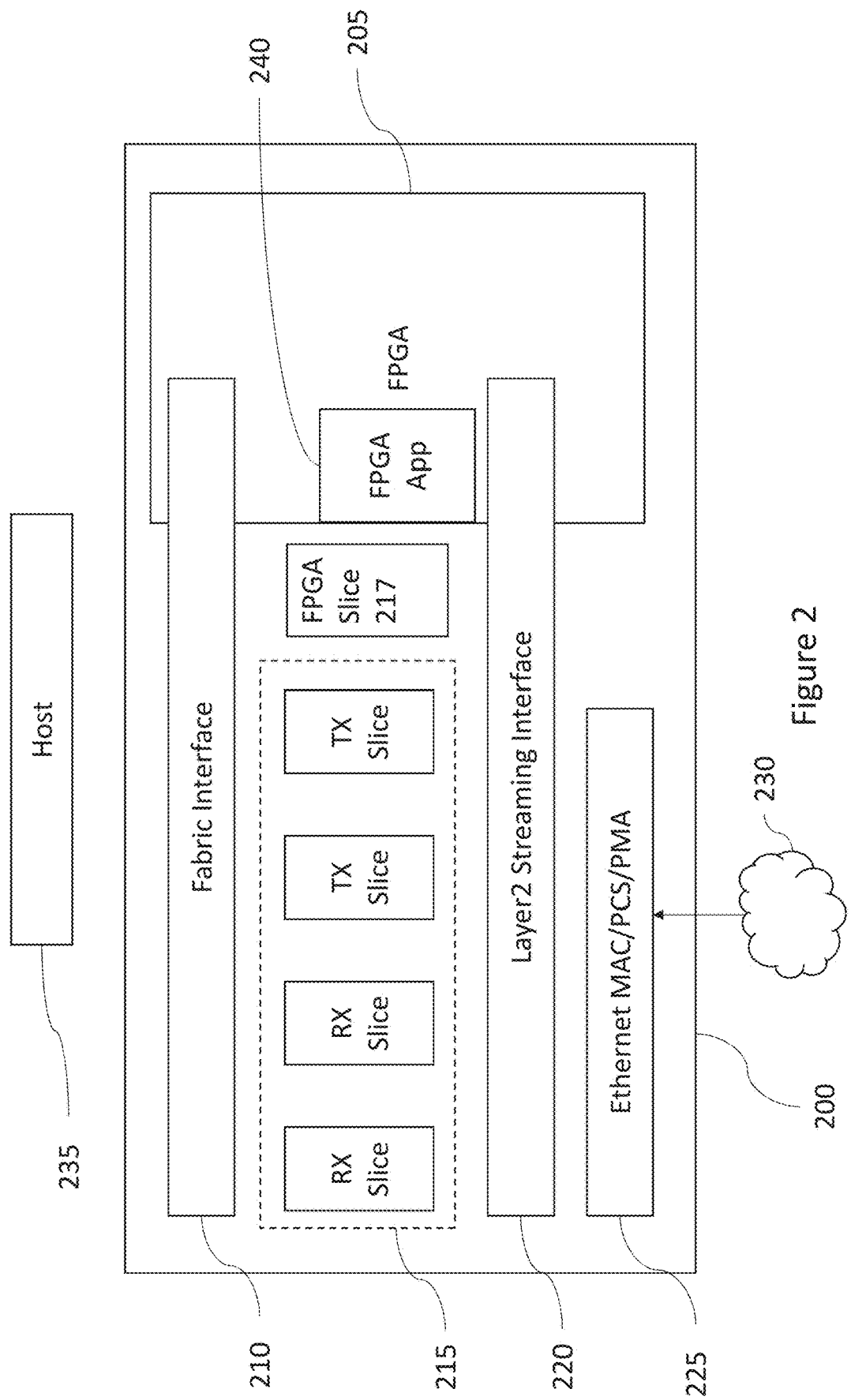
FIG. 2 schematically shows a more detailed schematic view of a network interface device.

Reference is made to FIG. 2, which shows one example of a network interface device in more detail.

The network interface device functionality may be embedded in a FPGA 205 in some embodiments. That FPGA 205 may have network interface functionality and FPGA functionality. The FPGA functionality may provide an FPGA application 240, which may be programmed into the FPGA 205 according to the needs of the network interface device user. In some embodiments, regions of the FPGA 205 may support applications.

In some embodiments, one or more FPGA slices 217 may be provided. The FPGA slices may be provided by the FPGA 205. The one or more FPGA slices may be regarded as a processing engine. One or more slices may be allocated inside the FPGA as required.

In some embodiments, a data path or data slice may have a part provided by the FPGA and a part provided by one or more of an accelerator and another processor.

The FPGA application 240 may, for example, provide filtering of the messages on the receive path from the network 230 to the host. The FPGA application 240 may provide a firewall. The FPGA application 240 may be used for any suitable purpose. For example, the FPGA application 240 may reduce data in one or more flows. For example, the FPGA application 240 may remove duplicate messages in an arbitration application. The FPGA application 240 may alternatively or additionally be used to aggregate data. For example the FPGA may buffer and consolidate network captures for more efficient host delivery. Alternatively or additionally, the FPGA may be used for hybrid processing. For example the FPGA may provide a toolkit to enable hybrid applications to implement fast-path processing (low-latency) on the FPGA while using a slice to handle slower (and more complex TCP) protocol activity. This is also known as Delegated-Send on the transmit side. The FPGA may be used to detect frames which are part of DDOS (distributed denial of service) attack. Those frames may be dropped or filtered. The FPGA may alternatively or additionally be used for machine learning with a neural network or the like.

The FPGA may be programmable to provide the FPGA application 240 using a high level programming language, such as C-based languages. The high level programming of the FPGA may be achieved using high level synthesis. The FPGA application 240 may implement a neural network and perform feature extraction or classification based on incoming frames.

In some embodiments, the network interface device functionality may be implemented as "hard" logic within the FPGA. For example, the hard logic may be application specific integrated circuit (ASIC) gates. In other embodiments, the network interface functionality may alternatively or additionally be implemented by "soft" logic. The FPGA application 240 may be implemented as "soft" logic. The soft logic may be provided by programming the FPGA LUTs (look up tables). The hard logic may be capable of being clocked at a higher rate as compared to the soft logic.

The network interface device 200 has a first interface 210 configured to receive data from the host 230. The first interface 210 may be a Fabric interface. The first interface 210 interfaces the transport engine 215 with the host computing device 235. The first interface 210 also interfaces the FPGA application 240 with the host 235. The first interface may provide an application programming interface, allowing the host 235 to perform memory read and writes to memory associated with the FPGA application 240.

Some drivers may be associated with the memory interfaces. This allows host applications to directly access the FPGA application 240 from the host and make use of the functions of the FPGA application 240 at the same time that the FPGA is used as a network interface device. The memory based interface may be mapped through a different PCI function than is used by the message passing interfaces. The message passing interfaces typically have one function per Ethernet port. The host software may attach a driver to each function and may attach the network stack to the interface to the network.

The network interface device 200 further comprises a transport engine 215, configured to process the data packets in accordance with a transport protocol, such as TCP/IP. The transport engine 215 may comprise a protocol stack. The transport engine 215 may comprise a plurality of slices or data pipeline, some of the slices being RX slices configured to perform receive processing of the ingress data packets received from the network 230, and some of the slices being TX slices configured to perform transmit processing of the egress data packets to be transmitted onto the network 230. In some embodiments, a slice may be able to handle both data to be transmitted and received data.

In the example shown, four slices are provided. However, it should be appreciated that in other embodiments, a different number of slices are used. In one embodiment, a slice may be arranged to process received data or to process data to be transmitted. In other embodiments, a slice may be arranged such that it is able to process received data and data to be transmitted. In some embodiments, the number of slices may be the same as the number of ports. In some embodiments, there may be a transmit slice and a receive slice for each port. In some embodiments, there may not be a direct correlation between the number of ports and the number of slices. In some embodiments, a slice can be switched dynamically from processing received data to processing transmitted data and vice versa.

Each slice may be regarded as a processing engine. Each slice may thus execute micro code to implement functions such as parsing, matching offload and delivery semantics for the data path. The slice may act on any bit of a frame.

The slices may perform a parsing action on the data which the slice is processing. There may be a matching action which matches the data against for example a filter and action function which performs an action or not in dependence on the result of the matching.

The network interface device 200 also comprises a second interface 220 configured to interface the transport engine 215 with the network 230 and configured to interface the FPGA application 240 with the network 230. The second interface maybe a layer 2 streaming interface. The second interface may provide an interface to the network 230 via a third interface 225. The third interface 225 may receive data packets from the second interface and cause them to be transmitted over the network 230. The third interface 225 may similarly receive data packets from the network 230 and pass them to the second interface 220. The third interface 225 may comprise a MAC interface. The third interface 225 may comprise a plurality of MAC interfaces. The third interface 225 may comprise one or more physical coding sublayer (PCS) interfaces. The third interface 225 may comprise one or more physical medium attachment (PMA) interfaces.

The fabric interface is configured to allow the co-resident FPGA application 240 to receive frames from the host. The FPGA application 240 may be able to transmit frames to the data path processing at the same bandwidth as the host PCI.

The layer 2 streaming interface is configure to allow the FPGA application 240 to receive frames form any active MAC layer interface and to transmit frames to a data path associated with that MAC.

The network interface device may provide functionality such as flow steering and low latency operation, hardware timestamping and clock synchronisation.

The third interface 225 is configured to receive the data packets from the network and pass them to the second interface 220. The second interface 220 is configured to pass the data packets to the transport engine 215, which performs protocol processing of the data packets, prior to passing the processed data packets to the fabric interface 210. The fabric interface 210 is configured to pass some of the data packets to the host 235, and some of the data packets to the FPGA application 240. The fabric interface may determine to pass data packets of a first flow to the host 235 and data packets of a second flow to the FPGA 205. The data packets received at the FPGA application 240 are processed by the FPGA application 240, before being passed to the host 235. Hence, the FPGA 205 can provide accelerator functions for some data packets prior to them being received at the host 235.

As explained, the FPGA 205 may provide a plurality of FPGA applications. The FPGA 205 could provide a first application and a second application. The data may be directed from a first interface 210 to the first field programmable gate array application 240 for processing. Additionally, however, the first and second interface may be configured to direct data to a second field programmable gate array for processing.

In some embodiments, the second interface 220 is configured to receive the data packets from the network and provide the data packets to a second FPGA application for processing. The second application may process the data by performing DDOS mitigation, such as searching the data packets for a DDOS attack and taking remedial action against a DDOS attack. The data packets may comprise updates to a data store, maintained by the first FPGA application. The second FPGA application may be configured to provide security by searching the data packets to detect any threats posed by the data packets and taking any action as required.

After processing by the second FPGA application, the second FPGA application is configured to provide the data packets to the transport engine 215 for protocol processing. Once the data packets have been processed, they are passed to a first interface, which is configured to provide the data packets to the first FPGA application. The first FPGA application is configured to process the data packets. The processing by the first FPGA application may comprise updating the data store maintained by the first FPGA application with the data contained in the data packets.

The host may also provide queries of the data in the data store maintained by the first FPGA application. In response to a query, the first FPGA application may be configured to provide the requested data from the data store to the host 235.

For data which is to be transmitted, the first interface 210 may be configured to receive data from the host 235 and to direct some of the data to the transport engine 215 for processing without it first being processed by the FPGA application 240. The first interface 210 is also configured to transfer some data to the FPGA application 240 for processing by the FPGA application 240. Once the data has been processed by the FPGA application 240, the FPGA application 240 may be configured to transfer those data packets to the first interface, which is configured to pass them to the transport engine 215 for protocol processing. The transport engine 215 is configured to process the data it receives to produce protocol processed data packets prior to them being transmitted onto the network. The protocol processed data packets may be passed to the second interface 220 and subsequently the third interface 225 prior to their transmission onto the network 230.

In some embodiments, a host application may communicate directly with the FPGA application 240 via memory mapping. The host application may write to a shared memory on the host 235, which is memory mapped to a memory accessible to the FPGA application 240. Hence, the FPGA application 240 may receive data written to the shared memory by the host 235. Likewise, the FPGA application 240 may write to the memory that is accessible to it, with that data being automatically copied from that memory to the memory of the host 235 so that it received by the host application 235.

In some cases, some data may be transferred to the transport engine 215 from the host 235 and some data may be transferred to the FPGA application 240 from the host 235 in parallel. For example, a first host application may transfer data to the transport engine 215 via the first interface, whilst a second host application is transferring data to the FPGA application 240 at the same time.

Figure 3:
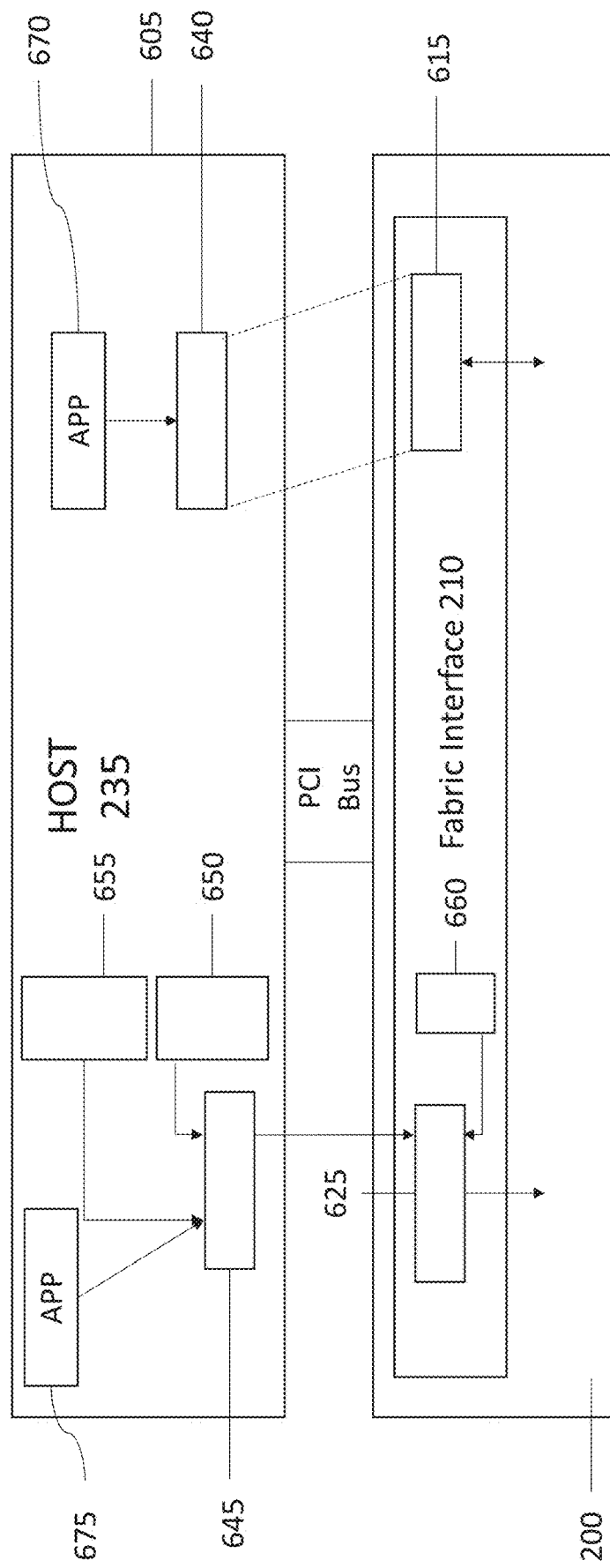
FIG. 3 schematically illustrates examples of data transfer mechanisms between a network interface device and host device.

Reference is made to FIG. 3, which illustrates how data may be transferred from the host 235 to the network interface device 200. To assist this some components of the host are shown and some components of the fabric interface 210 are show. (For clarity other of the components of the network interface device are not shown in FIG. 3). As explained previously, the first interface 210 is configured to receive data from the host 235. The host 235 may make the determination as to which of these is to apply to particular data. The host 235 may transfer data using different methods to memory associated with the first interface 210. For example, the host 235 may memory map data to a first memory 615 of the first interface 210. The first interface 210 is configured to provide the data in the first memory 615 to the FPGA application.

Alternatively, the host 235 may transfer data to a second memory 625 of the first interface 210. The first interface 210 may be configured to provide the data in the second memory 625 to a transport engine (provided by a TX slice for example) for processing. The first memory 615 and the second memory 625 may each comprise one or more buffers. This option may be used by an application which may naturally suit or may have been originally written to use a message passing communication paradigm rather than memory mapped. Some applications may have been written with a network communication in mind and may be using standard network protocols and the socket ( ) API to communicate.

The host may comprise a memory 640, which is memory mapped to the memory 615 on the network interface device 200 or vice versa. The memory mapping may be such that a user level process/host application 670, which is configured to write to the memory 640, and the network interface device 200 both have access to shared memory to which data is written.

The communication between the FPGA application and the host is bidirectional, i.e. the FPGA application can also transfer data to the host 235 as well as receive data from the host 235. To transfer data to the host 235, the FPGA application is configured to write data to the shared memory so that a user level process 670 running on the host may access the data.

The host 235 comprises a memory 645 at which data may be stored for transfer to the memory 625 of the network interface device 200. The data may be provided to the memory 625 from a second application 675 running on the host 235. Hence, the second application 675 may transfer data using this socket interface to the network interface device 200. The data in memory 625 is provided to the transport engine. The host 235 also comprises a transmit queue 650 comprising a series of pointers pointing to locations in the memory 645 from which data is to be transferred to the network interface device 200. The host may comprise a queue 655 identifying the next available location in the memory at which data is to be written by the application 675. The queues 650 and 655 may comprise FIFO buffers. The data may be stored in the buffer 645 at the next available location—as identified by the next pointer in the queue 655—by a user level process 675. A processor of the host device is configured to read the next pointer from the transmit queue 650 and read the data from the buffer 645 at the location identified by the pointer and transfer the data to the network interface device 200. The network interface device 200 is configured to store the data in memory 625 at a location identified by the next pointer in the receive queue 660. The data in memory 625 may then be provided to the transport engine for protocol processing.

It should be appreciated that in some embodiments, the host may be provided by an embedded system with CPUs connected to the network interface device via a bus PCI or AXI (advanced extensible interface) where the CPUs are within the same ASIC (application specific integrated circuit) SOC (system on chip) device as the network interface device.

The communication between the transport engine and the host 235 is also bidirectional. A similar memory transfer mechanism may be implemented for transfer of the data from the fabric interface to the host 235.

Some of the data path components of the network interface device may be configured at runtime. These components comprise one or more of: data path slices, which implement functions such as switching, steering, (de)encapsulation etc.; and accelerators which may perform a variety of functions such as host offloads, gateways, security and other applications.

In previously proposed network interface devices, the control plane may be managed by a management CPU (MC) which configures the data paths by writing registers, or passing messages to the data path components. The control plane is carried by one or more control buses that are separate from the data path.

In some embodiments, the different data path slices such as previously discussed may have different configuration requirements. The configuration of the data paths may change over time. Some embodiments may provide a mechanism to forward configuration to such components from the configuring agent or component.

In some embodiments, a network interface device may be structured such that a number of FPGA slices are present. It may be that there are a two or more FPGA applications sharing the network interface device. The different applications may be on the same slice and/or different slices.

In some situations an entire FPGA slice may be allocated as a unit, memory mapped to the host and bound to a single high-level application instance using a framework such as OpenCL. This is convenient, but may be wasteful of resources if a number of applications require smaller amounts of FPGA than is provisioned by the slices. It is possible to independently re-program areas of FPGA both within a single slice and entire slices.

The network processing functions may be bound to the physical Ethernet ports and at least some degree of processing to be active so long as a device is active. The network flows which are handled by the network processing functions need to be passed onto the appropriate FPGA applications for which they are instantiated. This instantiation may be dynamic. For example logic regions may be programmed and re-programmed. Network flows may be required to be parsed, identified and routed through chains of such FPGA applications and optionally mingled with hard-ASIC accelerator blocks.

Figure 4:
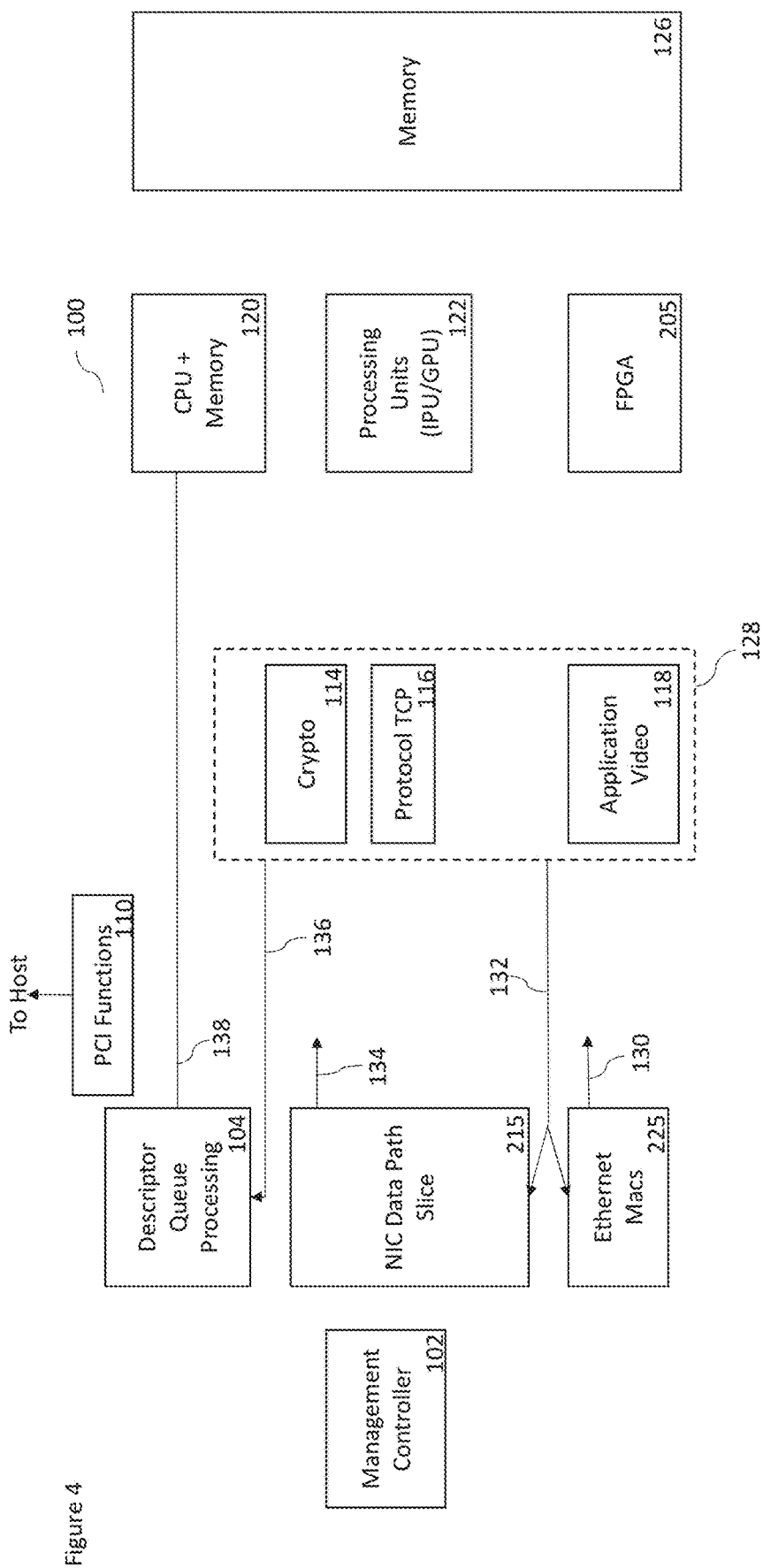
FIG. 4 schematically shows components of a network interface device; shows a data processing system according to embodiments of the application.

Reference is made to FIG. 4 which schematically shows a network interface device. Those blocks which are the same as shown in FIGS. 2 and 3 are referenced by the same reference number. It should be appreciated that the arrangement of FIG. 4 may be incorporated in a network device such as shown in FIGS. 2 and 3. In that scenario, the network interface device may be comprise the additional components shown in FIG. 4. In other embodiments, the arrangement of FIG. 4 may be provided in a different network interface device. It should be noted that the functions shown in FIG. 4 are by way of example only and different embodiments have different functions in addition and/or in the alternative.

A management controller MC 102 is provided which is configured to control the configuration of the different functions of the network interface device, as will be described in more detail.

A MAC interface 225 such as previously described is provided as is a data slice 215. In practice there may be more than one slice. One or more dedicated accelerators 128 or other components may be provided. The components may comprise one or more of: a cryptographic component 114 for one or more of encryption and decryption; a protocol processing engine 116, for example a TOE; a video processing component 118; and/or the like.

One or more of the components in a data path may be programmed using a high level language such as C or P4. Thus in some embodiments, the data-path itself can be constructed using a high level language rather than a pre-existing data-path being only programmed. In some a high-level program can decide that it needs a NIC to be constructed with particular properties. These properties may comprise one or more of network interface type, network interface speed, host interface (e.g. PCI) type, host interface speed, connected to a particular CPU data-path. The particular data path may run a particular P4 program chain of offloads and/or use particular hardware accelerators. The particular data path may interface to the host using OpenOnload (a Solarflare network stack) or interface to a particular OpenCL (open computing language) program, This may be dynamically provisioned and composed in for example a data-centre. In some embodiments, the NIC and its accelerator hardware may be constructed on the fly in a manner which is customisable for the application.

Figure 10:
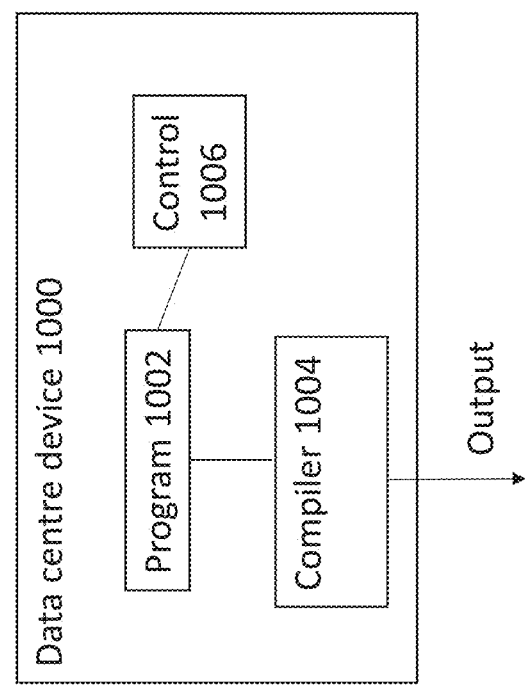
FIG. 10 shows a data center device.

Reference is made to FIG. 10 which schematically shows a data center device 1000 provided in a data centre. The device comprises a program function 1002 which is configured to provide a high level program which is used to construct a data path in the network interface device. The program function may be controlled by a control function 1006 to provide the required high level program. The device comprises a compiler 1004 which is configured to provide a compiled output of the high level program. This compiled output is provided to the network interface device. This may be provided via the network or other connection. The functions shown in FIG. 10 may be provided in a single device or across a plurality of devices. One or more of the functions may be provided by hardware which is suitably programmed by computer code to cause the hardware to provide the required function. Common hardware may be shared by one or more of the functions. Alternatively or additionally separate hardware may be provided for one or more functions. The hardware may comprise any suitable hardware such as a processor. The data center device may be a server or the like.

The compiled output is used by the management controller to produce configuration command for one or more components. Alternatively or additionally the compiled output is used by the management controller to provide programs for execution in a component. Alternatively or additionally the compiled output is used by the management controller provide a logic specification (which itself is compiled) for new custom hardware components.

For some types of components, such as a CPU, then the management controller ensures that the CPU is properly connected at the interface level. In some embodiments, the management controller delivers the compiled code which runs on the CPU. In some embodiments, the MC would define an interface through which the compiled code is delivered Thus the high level language program, which is compiled is used to specify the structure of the network interface device. The process of compiling provides commands to assemble the network components and/or commands to program the components. The commands may be propagated to the required components by the management controller.

In some embodiments the compiler may instead be an interpreter or any other form of function which translates the high level language into lower level commands, programs or logic descriptions.

The network interface device is provided with a PCI function 110 for enabling communication with the host.

The network interface device comprises a descriptor queue processing function 104 which will be described in more detail later.

The network interface device may be provided with processing capability in the form of one or more of: one or more FPGA 205; one or more processing units such as an IPU or GPU; and one or more CPU. One or more of these processors may provide one of more of the components previously described. Alternatively or additionally one or more other processors or other suitable hardware may be configured to provide one or more of the components.

In some embodiments one or more of the processor may be configured to provide one or more accelerating or processing functions. In some embodiments, the CPU may provide a virtual NIC VNIC function.

Memory is also available to the network interface device. This is referenced 126. The memory may be a previously described. The memory may be memory in the network interface device and/or may be in the host device. There may be an on-chip private or dedicated bus between the memory and the memory controller, in some embodiments.

In some embodiments, the control plane or configuration information is carried over the data path, rather than requiring separate control buses. In some embodiments, requests to update the configuration of data path components are encoded as messages which are carried over the same buses as network packets. Thus the data path may carry two types of packets: network packets and control packets.

Control packets are formed by the MC, and injected into the data path using the same mechanism that the MC uses to send network packets. This same mechanism may be a transmit queue. Control packets may be distinguished from network packets in any suitable way. In some embodiments, the different types of packets may be distinguished by a bit or bits in a metadata word.

In some embodiments, the MC is considered to "own" the resources. As such the management controller is configure to control the allocation of the resources.

In some embodiments, the MACs and transmission queues may not set the control bit and so cannot inject control packets. However in other embodiments, the MACs and transmission queues may set the control bit or bits and thus be able to inject control packets.

In some embodiments, the control packets contain a routing field in the metadata word that determines the path that the control packet takes through the data path. A control packet may carry a sequence of control commands. Each control command may targets one or more data path component. The respective data path component is identified by a component ID field. Each control command encodes a request for the respective identified component. The request may be to make changes to the configuration of that component and/or to read configuration state or other data.

Read commands include a payload area, which the data path component overwrites with the requested data. This data can be used by a subsequent component, for example in the data path and/or be used by the configuring entity.

Each control command may have a status field. This may be initialised, for example to zero. When the command is executed by a data path component the status is updated to indicate success or an error.

In some embodiments, control buses may not be required. This may free routing resource, make it simpler to meet timing requirements and/or simpler to implement.

Configuration changes may be ordered with respect to the stream of network packets. Each network packet may see either the configuration prior to a given control packet, or after the control packet. Changes to two or more data path components encoded in a single control packet appear atomic to network packets.

This may simplify the design of data path components and the firmware that manages them. For example consider a case where there are two tables, with the first yielding an index into the second. With a separate control channel, when configuration changes are out-of-band, care is needed when making related changes in the two tables. In that scenario, it may be necessary to pass a barrier through the data path before reusing a freed entry for example. In contrast in some embodiments this is not necessary.

Testing may be simpler and faster in some embodiments. A test vector may be formed that consists of an interleaving of control and network packets. The configuration seen by each network packet is unambiguous and not dependent on timing. Thus the results may be deterministic, and there is no need for pauses or barriers to wait for configuration changes to be applied.

It is also sometimes desirable to make multiple changes atomically. Consider the case of transitioning a VNIC into multicast promiscuous mode: It is desirable to atomically add a multicast-all filter and remove all other multicast MAC filters. A single control packet may be sent to the required entity. In this case, that entity may be the "filter table". The filter table would interpret the control packet and implement the combined operation with the required atomicity constraints. In this embodiment, the effect of removing and adding some filters may be viewed as a single operation with respect to all data flowing through the filter table.

In some embodiments, all components requiring configuration may need to be reachable via the data path from all agents that apply configuration, and vice versa. For example, the MC may be able to transmit control packets to all data path slices, and data path slices may be able to return control packets to the MC.

It should be appreciated that in some embodiments, there may be a separate control path for some but not all components.

In some embodiments, the size of a control packet may be defined by the maximum transmission unit MTU of the data path. In other embodiments, where the data path does not reorder packets, two or more control packets may be linked. The two or more control packets may be linked such that they are not interleaved with network packets.

In some embodiments, where there are two or more control messages, two or more control messages can be combined into a capsule, where a capsule contains one or more messages. Each message is addressed to a component which is controllable. If there are more than one message then all the actions required by the messages are carried out atomically relative to the packet stream in which the capsule is embedded.

For example, there are components C1 and C2 which have been composed (interconnected) so that packet streams are delivered to C1 then to C2 then somewhere else and a packet stream of Frames F1, . . . . FN. A capsule contains the messages [M1, M2] where M1 is addressed to C1 and M2 is addressed to C2 and the meaning of M1 and M2 is M1 stop processing frames and M2 start processing frames. Then the effect of F1, F2, F3, [M1, M2], F4, F5, . . . (assuming that previously C1 was processing frames and C2 was not) is that C1 would process frames F1-3 and C2 would process frames F4 onwards. Thus the effect of the combined commands in the capsule is atomic relative to the packet flow even though there are multiple connected components.

In some embodiments, it may be necessary to pass a barrier through the data path. This may for example be when tearing down resources. A barrier may be provided in the form of a control packet that does not carry any commands. For example, the barrier control packet could be passed in turn from upstream components to all downstream components for a given topology of components. Each upstream component would thus stop sending data to its downstream components in a controlled manner In some embodiments, only the MC will generate control packets. In other embodiments, one or more other agents to components may be configured to generate control packets. For example, drivers on the host or on embedded application processors could inject control packets through transmit queues TxQs, with a flag in the Tx descriptor identifying a control packet.

A hardware accelerator may configure the network interface device by sending control packets directly.

In some embodiments, where there is more than one entity which is able to configure the components on the network device, there may be lower latency and higher throughput for configuration updates than passing all such updates through the MC. This option may allow a plurality of independent initiators to request changes without forcing serialisation through the shared MC command interface.

In some embodiments, the control commands in network packets may be encoded. This may allow the control path to be accessed from unprivileged and non-driver components, such as applications on the host, and from the network.

For example, an application may configure an accelerator kernel. This option means that the MC and/or the driver of the network interface device does not have to know how to configure such accelerators. Accelerators may pose a challenge for the control plane because in many cases the host drivers and MC may not know how to configure them.

For example version 2 of Windows NDIS (network driver interface specification) RSS (receive side scaling) may require fast updates to RSS indirection tables from each RSS channel, and without locking. This may involve dedicated hardware tables which are memory mapped to the driver for each RSS channel and updates effected by a driver writing updated values to a table. If these updates need to be handled internally by the control plane then the hardware logic interfacing with the driver may construct itself the control plane messages as a result of the writes. Some embodiments may allow the network interface device to be configured to support such updates.

It should be appreciated, as shown in the above example, that there may be hardware which may not be controlled by the uniform control channel and that other mechanisms may co-exist to support such hardware.

Control packets may be used for dynamic discovery of components on the data path. For example the MC may generate control packets to probe any accelerators provided by the network interface device. The MC may be informed by a language runtime (which is in the process of for example re-reprogramming an FPGA region where a one or more accelerators are or have been provisioned). In some embodiments, this may be achieved by one or of:
  a wildcard address matched by all components;
  a known probe command handled by all components; and
  a hop count where each component decrements the hop count and only processes the command if it reaches zero.

The control packet encoding may be of any suitable format. The format of the metadata word may be shared as far as possible with network packets.

The metadata word of control packets may comprise one or more of:
  a field indicating whether a packet is a control packet or a network packet. This may be provided in some embodiments by a single bit. In other embodiments, this may be provided by a plurality of bits;
  a routing field to control the path that the packet takes through the data path. This may define the order that the packet takes through the data path, thus controlling the order in which the components are configured; and the rest of a control packet may comprise a sequence of control commands.

In some embodiments, the start of each control command may be aligned with respect to a particular natural binary width such as 8, 16, 32 bits.

Each control command may comprise one or more of:

component ID—this may select the component to handle this command;

length—this may determine where the next command starts;

command ID—this may define what action is requested. In some embodiments there may be one or more global IDs and/or one or more IDs specific to components;

status—this may be set to a particular value if the command is handled. This may have a different value when not yet handled. In some embodiments, the status may be set to non-zero when the command is handled; and body—the size and layout may depend on the component ID and/or the command ID.

In the case of read commands the body may have a region into which the component writes the requested data.

Where there are two or more data path slices a control packet may be multicast to two or more or all slices. Alternatively, the MC may generate a control packet per slice, each of which is routed explicitly.

In some embodiments, a data path component may skip control commands with a non-zero status. This may be applied in the case where a data path has two or more components of the same type. In some embodiments, each component may have a unique ID.

Messages may be mediated by the MC driver interface MCDI. The messages may be one or more of a discovery message, an allocation message, a setup message and a tear down message. The MCDI may enforces capabilities and/or respond according to global policy. The global policy may be provided by relatively high or the highest privilege level controlling entity.

Figure 5:
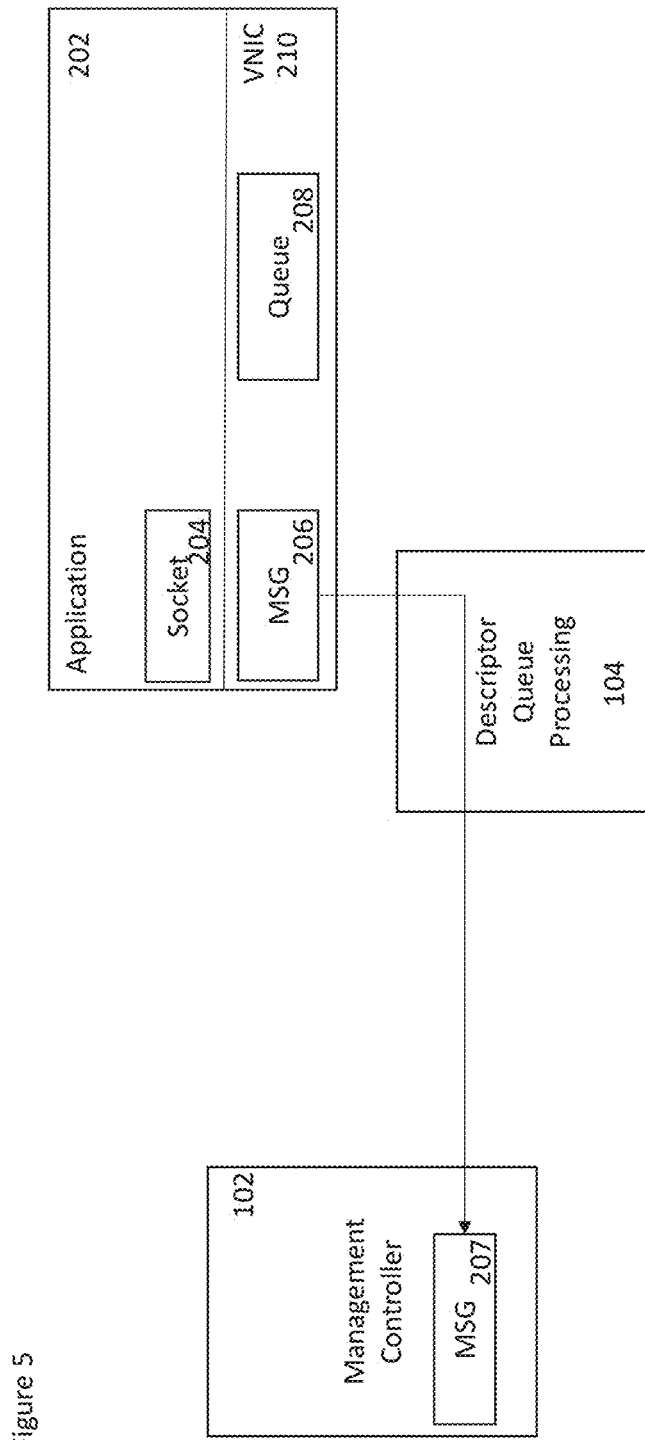
FIG. 5 schematically shows communication between an application and a management controller to cause components of the network interface device to be configured to support the application.

Reference is made to FIG. 5 shows schematically an application 202 which has a socket. A virtual NIC VNIC 210 is shown having a queue 208 and a message function 206. The MC 102 has a message function 207. In this example, the application can use the VNIC directly or a socket. If the application uses a socket, then the VNIC can exist in the address space of the application as shown in FIG. 5 or within a privileged context such as a hypervisor or operating system.

Posting a transmit descriptor to a message addressed to the MC cause the message to be transferred to the MC. Posting a receive descriptor to the queue 208 allows the MC to reply. A descriptor processing function 104 is provided. The descriptor processing function allows host software to send information "a descriptor" to the MC which corresponds to a memory location to deliver data from/transmit to and/or may contain a control word The contents of the message are interpreted by each component according to its predefined syntax and semantics. The MC 102 in this respect is the same as other components.

Figure 6:
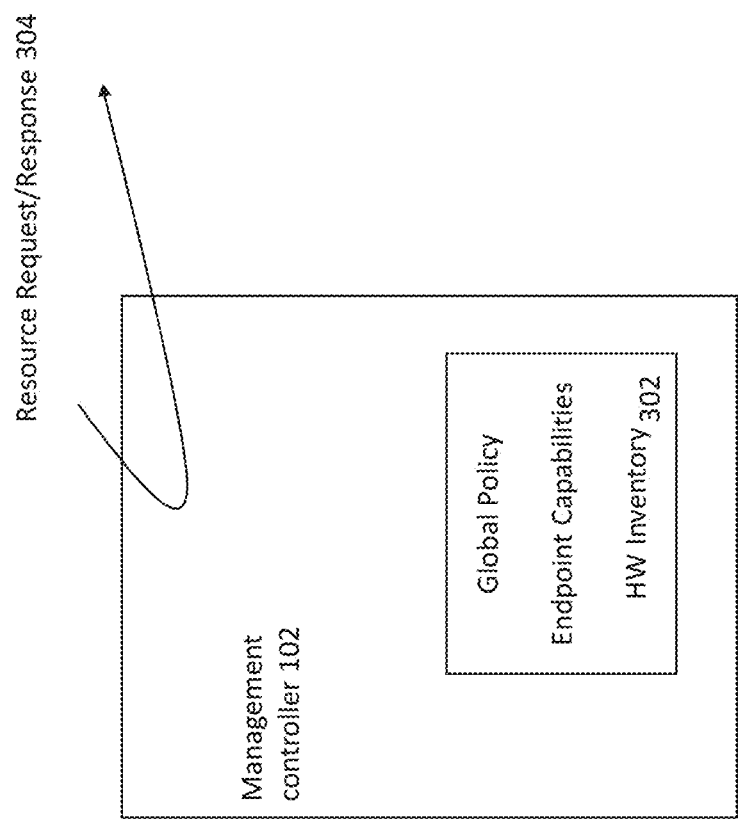
FIG. 6 schematically shows the management controller.

The API may be a RESTFul or similar API which enables operation type and semantics to be discovered. In this regard, reference is made to FIG. 6. As schematically shown in FIG. 6, the MC 102 has access to or stores information 302 such as global policy information, endpoint capabilities and a hardware inventory.

In some embodiments, the control message may be such that telemetry data or performance data may be obtained from one or more or all of the pipelines.

The management controller may be configured to allow one or more policies to be changed. In some embodiments, depending on the policy which it to be changed, this may only be done by one or more entities with a relatively high privilege. This may for example be an entity of a kernel of an operating system.

The management controller is also configured to ensure that privilege is enforced. Thus an application is only able to use resources in the network interface device which are available given a particular level of privilege. Thus applications cannot get resources allocated to which they are not entitled.

In some embodiments, the management controller may conjugate or join control messages. This may be used where more than one control message is required. These control conjugated control messages may be such that no data messages are able to enter a data path between the two or more conjugated control messages.

The MC is configured to respond to allocation requests. A resource request may be received from an application, an operating system, and a controlling application which might be host resident or authorised to send requests over a network (encrypted) control plane.

This request may be configuration or reconfiguration of one or more resources. By way of example, a request might be to one or more of allocate a particular accelerator (such as an IPSec decryption block), to join one already allocated block with another, filter a particular IP flow onto an already joined processing pipeline or any other suitable request. Based on the information, the MC is able to provide a cause the one or more components to be reconfigured or configured and to provide a response confirming that this has been done.

In some embodiments, the response may indicate a failure. This may be because the requestor was not suitably privileged and/or resources are not available The components may be a hardware unit and/or implemented by software.

Figure 7:
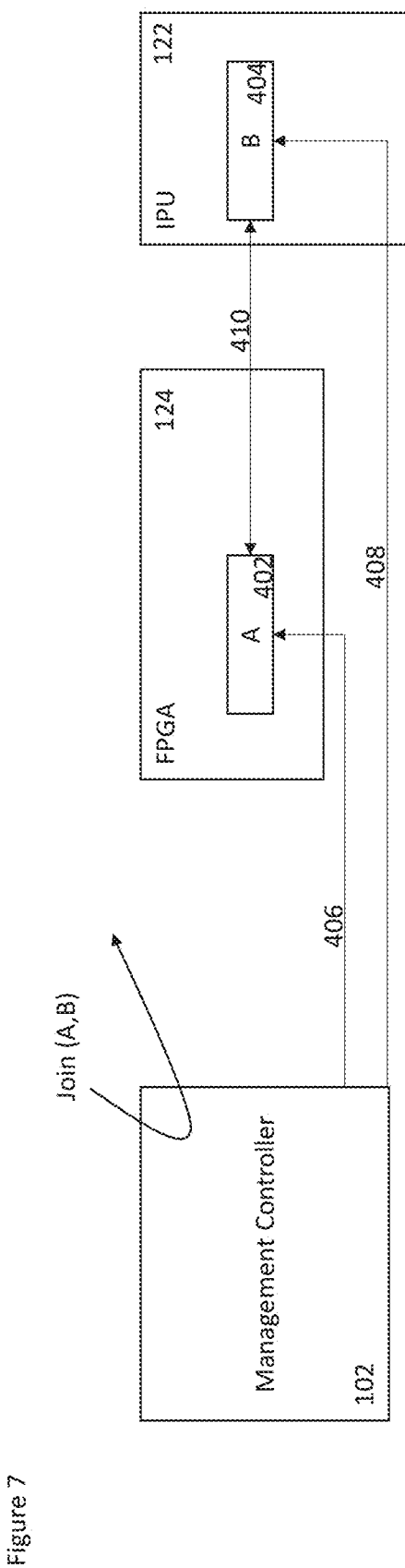
FIG. 7 schematically shows the configuration by the management controller of two components of the network interface device.

As for example shown in FIG. 7, the MC 102 is configured to respond to a join request for joining a first resource unit A 402 and a second resource unit B 404. In this example, the resource unit A 402 is provided by the FPGA 124 and the resource unit B 404 is provided by the IPU 122. The resource unit A may be a subset of the unit, for example the FPGA or the entire unit of the FPGA.

The MC is configured in response to the join request send control information 406 to the first resource unit 402 and control information 408 to the second resource unit 404. The control information for both resource units is in the same control packet. The control packet is received first by the first resource unit and then by the second resource unit. This control information causes the configuration of the first and second resource units such that that control data and data can be sent in-band between the first and second resources. This is referenced 410.

The control information cause one or more of the creation of bus resources, allocation of resources, and allocation of network fabric.

It should be appreciated that the processing which is provided by a respective data path or pipeline may be perform full processing of the data required by an application or may only provide a partial processing of the data required by an application. In some embodiments, further processing may be performed by one or more other components on the network interface device and/or on the host device.

It should be appreciated that in some embodiments, the application or at least part of an application may be running on the network interface device. The application or at least a part of the application may be off loaded to the network interface device. Thus an application may be fully or partially offloaded to the network interface device.

It should be appreciated that one or more of the components on the network interface, such as for example the accelerators or the like may partially process or fully process the data. For example, the network interface device may be such that a TCP component on the network interface device is configured to partial protocol process received and/or transmitted frames. The other part of the protocol processing may be performed in a host device or by another processing function such an FPGA or CPU. The protocol processing function performed on the network interface device may be to complete the protocol processing or to start the protocol processing.

Some embodiments may be use a network processing function in a data pipeline to capture a payload which is pushed to a neural network component. That neural network component may process the received data but without attempting a classification. The classification may be performed by another processing function on the network interface device or on the host device.

It should be appreciated that the management controller may insert or remove components into a pipeline.

It should be appreciated that one or more components on the network interface device may be reserved. The components may be reserved for particular functions, particular applications and/or functions at a given level of privilege. In some embodiments, a reserved component may not be controlled by the management controller or the management controller may only be able to perform limited control functions with respect to such a reserved component.

Figure 8:
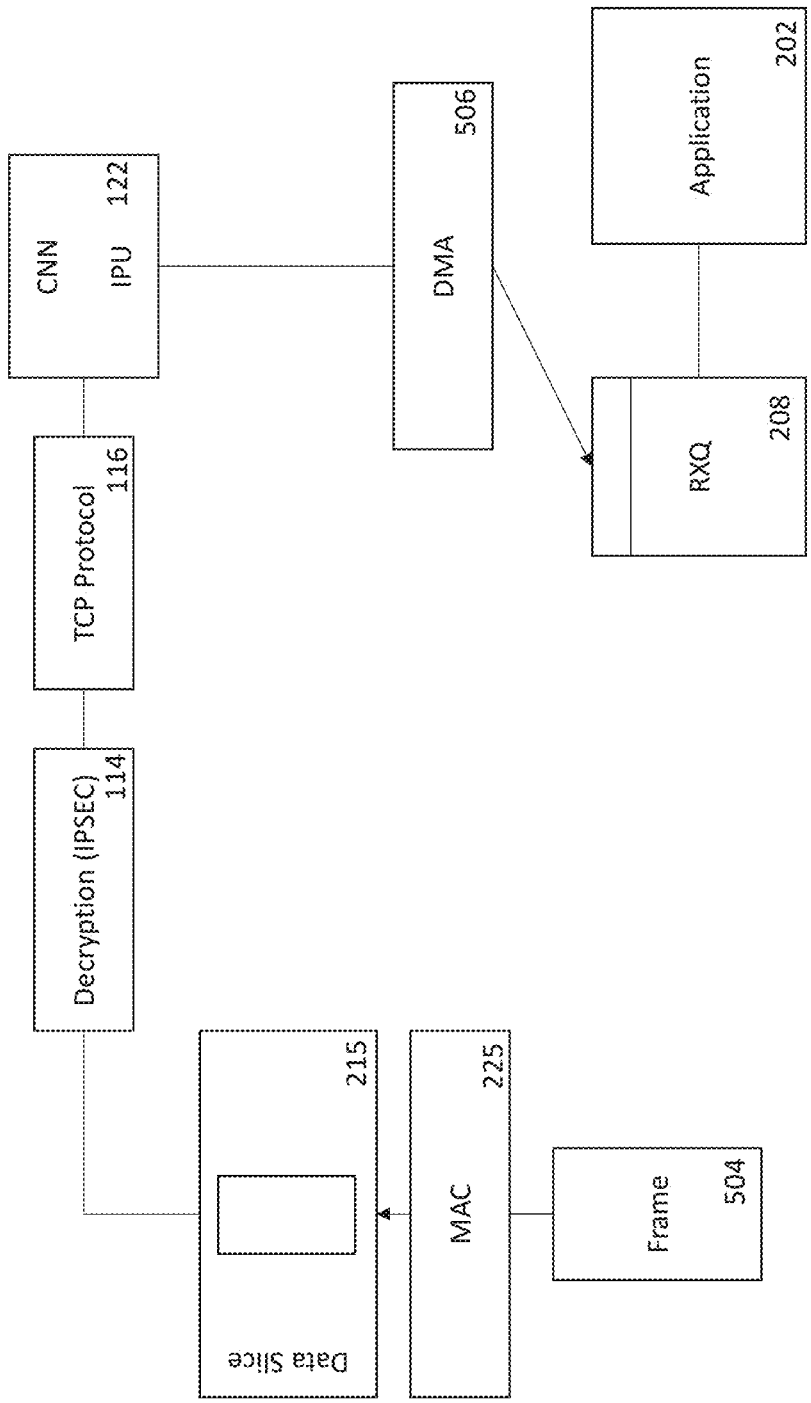
FIG. 8 shows an example of a data path provided in the network interface device to support an application.

Reference is made to FIG. 8 which schematically illustrates the processing of a frame. It should be appreciated that to provide this data path, the control packet setting up this data path will have traversed the individual components in the same order to cause each component to be configured as required.

A frame 504 is receive at the MAC interface 225.

After MAC processing, data from the frame 504 is input into a data slice 215. This data may be processed by a receive slice. The receive slice may perform any suitable processing. In this example, the data slice parses the data flow, removes virtual extensible LAN (VxLAN) encapsulation and performs tunnelling offload. The data slice may provide switching.

It should be appreciate that the functions provided by a slice are by way of example only and a data slice may alternatively or additionally be configured to perform different functions.

The processed data is output by the data slice to the decryption function 114 which decrypts the data.

The decryption function 114 is configured to output the decrypted data to the TCP protocol procession function 116 which is configured to perform TCP reassembly.

The output of the TCP protocol processing function is in the form of payload byte stream. This byte stream is provided by a convolutional neural network CNN is configured to be provided to a convolutional neural network function provided by the IPU 122.

The machine learning output is provided to a DMA function 506 which stores the data in memory and provides an entry to a receive queue RXQ 208.

The application 202 will then consume the data.

In some embodiments, the data path may have to decrypt twice. For example, IPsec is a tunnelled protocol using for example NVGRE (Network Virtualization using Generic Routing Encapsulation) needs decrypting before parsing a flow which itself uses the TLS (transport layer security) protocol which also requires decryption.

On the transmit side, this would require two separate encryption operations.

The operational parameters for each unit may be set by the host application posting messages to each or any unit using their internal address. These messages may be of a similar structure to the messages used to "join" the units but instead may instead configure or control already joined units.

The design of the network interface device block may have two or more slices/pipes (M) for data-paths which may be multiplexed with one or more MACs to create physical Ethernet ports and one or more host bus interfaces (e.g. PCI functions). The physical implementation of a system on chip SOC may comprise 1 . . . N physical dies where each die contains a network interface block. Some embodiments may, at run time dynamically bind (or compose) together slices with MACs and host interfaces from any combination of the network interface blocks to form 1 . . . (N*M) logical network interfaces which are presented to the host operating system as different logical devices. In this regard, reference is made by way of example only to FIG. 9.

Figure 9:
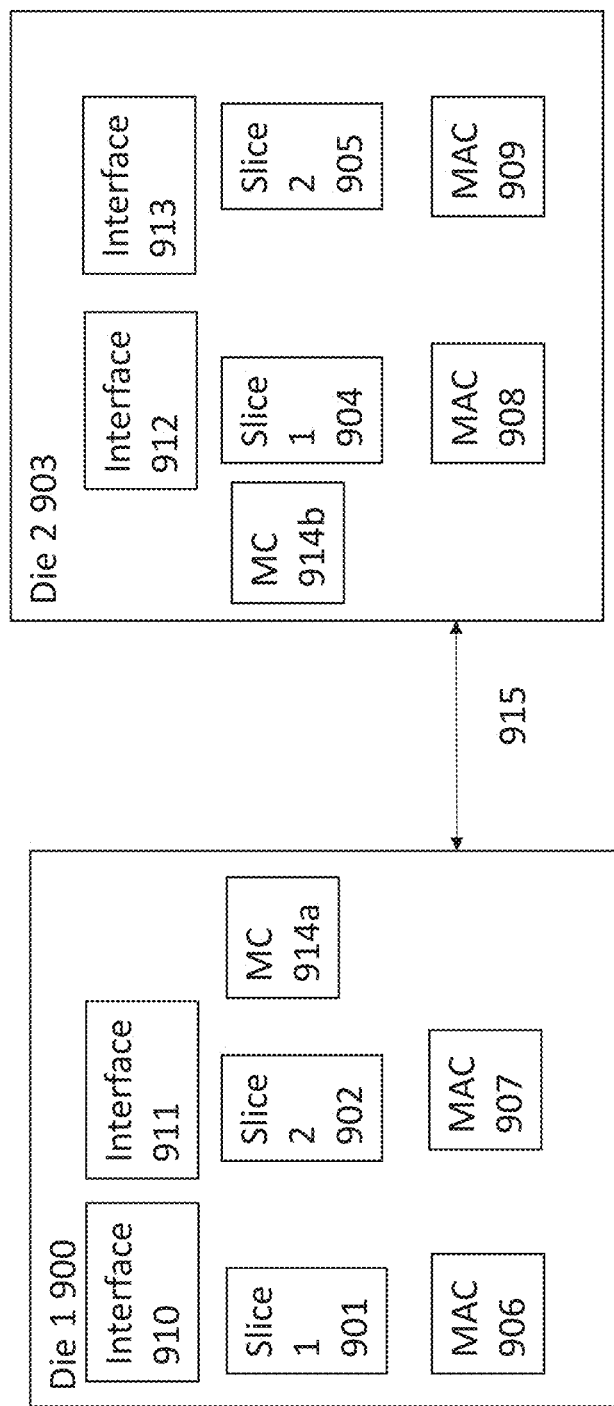
FIG. 9 shows an arrangement where the network interface device has two dies.

As shown in FIG. 9, there is a first die, die 1 which is referenced 900 and a second die, die 2 referenced 903. Each die is shown as having a first slice, slice 1, and a second slice, slice 2. For die 1, these slices are respectively referenced 901 and 902 and for die 2, these slices are respectively referenced 904 and 905.

The first die is shown as having a first interface 910 and a second interface 911 and the second die is shown as having a first interface 912 and a second interface 913.

The first die is shown as having a first MAC function 906 and a second MAC function 907 and the second die is shown as having a first MAC function 908 and a second MAC function 909.

A management controller is provided to cause the required data paths to be set up. The management controller may be as previously described. The management controller may be provided in any suitable location. For example a management controller may be provided on one of the dies such as die 1 or die 2 or both dies. In this example, the management controller is provided on both dies. The management controller on the first die is referenced 914a and the management controller on the second die is referenced 914b. The management controllers on the two dies may coordinate one with the other. It should be appreciated that where there is more than one management controller, one management controller may be a master controller with one or more other management controllers acting as slaves. Alternatively, where there is more than one management controller, the management controller can coordinate as a distributed peer-peer system.

The management controller is configured to output control messages onto the data path which is schematically represented by referenced 915 which is provided between the dies. The data path in practice is also provided in the respective dies, although this is not shown for clarity.

By way of example only a data path can be set up which comprises the first interface 910 of the first die, the second slice 902 of the first die and the first MAC function 908 of the second die. Another example might be where a data path comprises the second interface of the second die, the second data slice 902 of the first die and the first MAC function 908 of the second die. In some embodiments, a data path may comprise any one of the four interfaces with any one of the four slices with any one of the four MAC functions. One or more of the interfaces, slices and MAC functions may be used in more than one data path.

It should be appreciated that in some embodiments, there may be a single die. In other embodiments there may be more than two dies. Where there is more than one die, a management controller may be provided on one, some or all of the dies.

In the example shown in FIG. 9, each die is shown as supporting two slices. It should be appreciated that this is by way of example only and some dies may support more than two slices or less than two slices. It should be appreciated, that in some embodiments, different dies may support different number of slices. In a dynamically configurable die, there may be different numbers of slices at different times. The number of slices supported may be dependent on the complexity of one or more of the slice and/or loading of the network interface dies.

Likewise the number of MAC functions supported may be more or less than two MAC functions. It should be appreciated, that in some embodiments, different dies may support different number of MAC functions.

Likewise the number of host interface functions supported may be more or less than two host interface functions. It should be appreciated, that in some embodiments, different dies may support different number of host interface functions.

In the example shown, there is a one to one ratio between the number of slices, network interface function and MAC functions. This is by way of example only and in other scenarios, there may be no such ratio. For example a MAC function may be used by one or more data slices. A network interface function may be used by one or more data slices.

In the example shown, each die is provided with a network interface, a MAC function and a data slice. It should be appreciated that a die may be provided with one, two or all of a network interface, a data slice and a MAC function.

In the example shown in FIG. 9 there are two dies. This is by way of example only, and in other embodiments, more or less than two dies may be provided.

In the example shown in FIG. 9, each slice is shown as being on a single die. This is by way of example only and in some embodiments, a slice may be supported by more than one die. In some embodiments, at least one slice may be supported by two or more dies. In some embodiments, one or more of the dies may be provide a processing function such as an FPGA and/or any of the other processing functions previously described.

In some embodiments, a slice may be regarded a processing engine. In some embodiments a slice may be regarded as a frame processing engine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus comprising:
 a network interface device comprising:
  a plurality of components to be arranged in a sequence to form a data path to process a flow of data in the data path one after another in the sequence; and
  a control component configured to change a configuration of one or more of said plurality of components in the data path by providing one or more control messages to the plurality of components in the sequence of said data path, said one or more control messages being provided to said plurality of components through the data path, wherein:
   said one or more control messages are provided from a component of the plurality of components to a subsequent one of the plurality of components in a direction of the flow of data in the sequence of the data path.

2. The apparatus of claim 1, wherein each of said plurality of components is configured to update its configuration in response to said one or more control messages such that data received after the control message in said flow is processed by the respective component with its updated configuration.

3. The of claim 1, wherein said control component is configured to receive a request and in response thereto to configure the one or more components.

4. The apparatus of claim 3, wherein the control component is configured to, in response to said request, allocate the one or more components to process a data flow.

5. The apparatus of claim 3, wherein said control component is configured to receive said request from an application.

6. The apparatus of claim 4, wherein said control component is configured to, in response to said request, configure said one or more components to process the data flow to provide at least a partial offload of data processing required for said application.

7. The apparatus of claim 1, wherein the control component is configured to provide at least one control message, of the one or more control messages, to cause said plurality of components to define a data pipeline for the flow of data.

8. The apparatus of claim 7, wherein the control component is configured to provide the at least one control message, of the one or more control messages provided by the control component, to cause one of creation and configuration of interconnect resources between at least two of said plurality of components to define the data path between the at least two components of said data pipeline.

9. The apparatus of claim 1, wherein:
 the control component is configured to cause one or more request control messages to be output; and
 at least one component of the plurality of components is configured to provide status information in response to receipt of the one or more request control messages.

10. The apparatus of claim 9, wherein the status information comprises one or more of status information, performance information and availability information.

11. The apparatus of claim 1, wherein said control component is configured to cause one or more policies to be changed and to apply said one or more changed policies.

12. The apparatus of claim 1, wherein:
 at least one component is associated with a first level of privilege; and said control component is configured to:
- in response to receipt of a request from an application, determine one or more privileges of the application regarding use of components; and
- in response to determining that the one or more privileges of the application entitle the application to make use of the at least one component associated with the first level of privilege, configure said at least one component.

13. The apparatus of claim 1, wherein said plurality of components comprise at least one of: an interface with a host device, a processing engine, and an interface with a network.

14. The apparatus of claim 1, wherein at least one component of the plurality of components comprises at least one accelerator.

15. The apparatus of claim 14, wherein said at least one accelerator comprises a hardware implemented accelerator.

16. The apparatus of claim 14, wherein said at least one accelerator comprises one or more of a video processing accelerator, a security accelerator, and a protocol processing entity.

17. The apparatus of claim 1, wherein the one or more control messages are configured to cause one or more of creation of bus resources, allocation of the one or more components to the data path and allocation of one or more interfaces.

18. The apparatus of claim 1, wherein said plurality of components comprise one or more of an FPGA, a CPU, a GPU and an IPU.

19. The apparatus of claim 1, wherein at least one of the plurality of components comprises an FPGA and at least one control message of the one or more control messages is configured to reprogram at least a part of said FPGA.

20. The apparatus of claim 1, wherein said device is provided by a plurality of dies, wherein said plurality of components comprise at least one component provided by one die and at least one component provided by another die, said dies being interconnected on a substrate to form at least a part of said device.

21. The apparatus of claim 1, wherein said one or more control messages comprise information indicating that said one or more control messages are control messages.

22. The apparatus of claim 1, wherein said one or more control messages comprise a control message including information identifying at least one of said plurality of components and a request for the at least one component.

23. The apparatus of claim 22, wherein the at least one component identified in said request is configured to, on receiving said control message respond to said request and update status information associated with the at least one component in said control message.

24. The apparatus of claim 22, wherein the at least one component identified in said request is configured to, on receiving said control message, respond to said request by providing requested data in said control message when said request is a read request.

25. The apparatus of claim 1, wherein said network interface device comprises an interface which is configured to receive a program which is compiled and which causes provisioning of one or more of: configuration commands for the one or more components; and one or more programs to be executed in the one or more components.

26. The apparatus of claim 25, wherein said configuration commands are provided by said control component in the one or more control messages.

27. The apparatus of claim 25, wherein said configuration commands are generated by said control component in response to execution of said compiled program in said control component.

28. The network interface device of claim 1, wherein at least one of the plurality of components comprises a processing circuit.

29. The network interface device of claim 1, wherein at least one of the plurality of components comprises a streaming processor.

30. A method for execution by a network interface device, the network interface device providing an interface between a computing device and a network, the network interface device comprising a plurality of components to be arranged in a sequence to form a data path to process a flow of data in the data path one after another in the sequence, the method comprising:
- changing, by a control component of the network interface device, a configuration of one or more of said plurality of components in the data path by providing one or more control messages to the plurality of components of the network interface device in the sequence of said data path, said one or more control messages being provided to said plurality of components through the data path, wherein the one or more control messages are provided from a component of the plurality of components to a subsequent one of the plurality of components in a direction of the flow of data in the sequence of the data path.

31. The method of claim 30, further comprising, following the configuring of each of said one or more components in response to said one or more control messages, processing received data at the one or more components with an updated configuration.

32. The method of claim 30, further comprising:
- in response to receiving by the control component a request from an application, configuring at least one component of the plurality of components.

33. The method of claim 32, further comprising:
- allocating, by the control component, the at least one component to process a respective flow of data in response to said request.

34. The method of claim 32, further comprising:
- in response to receiving the request at the at least one component, processing by the at least one component a respective flow of data to provide at least a partial offload of data processing required for said application.

35. The method of claim 30, further comprising:
- in response to at least one control message provided by the control component, causing one of creation and configuration of interconnect resources between at least two of said plurality of components to define the data path between the at least two components.

36. The method of claim 30, further comprising:
- outputting, by the control component, one or more request control messages to at least one of the plurality of components, the at least one component being configured to, in response to the one or more request control messages, provide status information.

37. The method of claim 30, wherein:
- at least one component of the plurality of components is associated with a first level of privilege; and
- the method comprises, with the control component:
  - in response to receipt of a request from an application, determining one or more privileges of the application regarding use of components; and in response to determining that the one or more privileges of the application entitle the application to make use of the at least one component associated with the first level of privilege, configuring said at least one component.

38. The method of claim 37, further comprising:
receiving a request identifying at least one of the plurality components;
receiving a control message at the at least one component identified in the request; and
in response to receiving said control message at the at least one component identified in the request, responding to said request and updating status information associated with the at least one component in said control message.

39. At least one non-transitory computer-readable storage medium comprising code that, when run on one or more circuits of a network interface device comprising a plurality of components to be arranged in a sequence to form a data path to process a flow of data in the data path one after another in the sequence providing an interface between a computing device and a network, causes the network interface device to perform a method, the method comprising:
changing, by a control component, a configuration of one or more of said plurality of components in the data path by providing one or more control messages in the flow of data to the plurality of components arranged in the sequence of said data path, said one or more control messages being provided to said plurality of components through the data path, wherein the one or more control messages are provided from a component of the plurality of components to a subsequent one of the plurality of components in a direction of the flow of data in the sequence of the data path.

* * * * *